United States Patent [19]
Williams

[11] Patent Number: 5,600,554
[45] Date of Patent: Feb. 4, 1997

[54] METHODS AND APPARATUS FOR SECURING, INTEGRATING, AND MANIPULATING EMPLOYEE PAYROLL AND HUMAN RESOURCE INFORMATION

[75] Inventor: Dale H. Williams, Marietta, N.Y.

[73] Assignee: Crucible Materials Corporation, Syracuse, N.Y.

[21] Appl. No.: 314,720

[22] Filed: Sep. 29, 1994

[51] Int. Cl.$^6$ ........................................... G06F 19/00
[52] U.S. Cl. ............................................... 395/201
[58] Field of Search .................... 364/401, 406, 364/401 R, 419.19

[56] References Cited

U.S. PATENT DOCUMENTS

| | | | |
|---|---|---|---|
| 4,812,627 | 3/1989 | Wexler et al. | 364/406 |
| 4,819,162 | 4/1989 | Webb, Jr. et al. | 364/401 |
| 4,847,791 | 7/1989 | Martin et al. | 364/554 |
| 5,117,353 | 5/1992 | Stipanovich et al. | 364/406 |
| 5,117,356 | 5/1992 | Marks | 364/406 |
| 5,459,657 | 10/1995 | Wynn et al. | 364/401 |

*Primary Examiner*—Donald E. McElheny, Jr.
*Attorney, Agent, or Firm*—Finnegan, Henderson, Farabow, Garrett & Dunner, L.L.P.

[57] ABSTRACT

A system for managing payroll data and human resource data for employees. The payroll data includes an employee-type and a plurality of payroll codes, and the human resource data includes an employee-identifier for each of the employees, a salary for each employee, and a plurality of HR codes. The system stores the payroll data and the human resource data receives user input including a pay period, selects human resource data for certain employees based upon predetermined criteria, stores the selected human resource data in in-progress tables, and generates a payroll by matching the employee-type for each employee with the employee-identifier and using the pay period and the salary for each employee.

20 Claims, 15 Drawing Sheets

FIG. 13

PERSONNEL ACTION FORM

NAME (L, F, M): ___ — 1310
EMP. NO.: ___ — 1315 / 1330
SSN: ___ — 1320 / 1335
BIRTHDAY: ___ — 1325

COUNTRY: ___
AGE: ___
ADDRESS: ___ — 1340
CITY: ___
STATE: ___ — 1350
ZIP: ___ — 1355
HOME PHONE: ___

SEX: ___ — 1360
ETHNIC: ___ — 1365
MARRIED: ___ — 1370
CITIZEN: ___ — 1375

EMPLOYMENT DATE: ___
SENIORITY DATE: ___
SERVICE: ___ — 1460, 1465, 1470

DISABLED: ___ — 1380
VETERAN: ___ — 1385
RESERVES: ___ — 1390
STATUS: ___ — 1395
UNION: ___ — 1450
JOIN DATE: ___ — 1455

DIR. DEP. ACCT. #: ___ — 1475

1345

| EMPLOYEE | CURRENT JOB | EMERGENCY | JOB HISTORY | ACCRUALS | DEPENDENTS | W-4 | QUICK RETURNS | BENEFITS | ACCIDENT |

ED & TRAINING    EXIT

1480

METHODS AND APPARATUS FOR SECURING, INTEGRATING, AND MANIPULATING EMPLOYEE PAYROLL AND HUMAN RESOURCE INFORMATION

TECHNICAL FIELD

This invention relates to computer software applications used to secure, integrate, and manipulate both employee payroll and human resource (personnel) information. The invention facilitates the integration of employee payroll information with human resource information so that users can access or otherwise manipulate both types of information simultaneously. The invention further facilitates the tracking of user(s) changes to both employee payroll and human resource information.

BACKGROUND ART

In recent years companies have been computerizing many of their business activities. In many cases, this computerization involves developing new systems, including both computer hardware architectures and software applications, that achieve specific business goals. Often times these goals fall into either one or both of the following categories: increase worker productivity and improve record keeping capability.

To increase worker productivity, companies have developed computer systems that enable employees (users) to perform routine activities more quickly and efficiently than they could by hand or with earlier generations of computer systems. Concerning improving record keeping capability, companies have developed computer systems that not only record different types of business information, but also provide facilities to report that information to employees in a variety of ways depending upon the employee's function in the company.

Two functions in a company involve different, but related, activities. The first function, commonly referred to financial services, provides the financial record keeping activities, including keeping track of company income and expenses. Among these expenses is employee salaries, i.e., payroll. The second function, now referred to as human resources, provides the administrative personnel activities.

One of the more complex activities for financial services is creating a payroll. Related to this activity is keeping track of payrolls throughout the course of business cycles (e.g., payroll history by year). Creating and tracking payrolls is complex because of federal tax laws, state tax laws (which are different for each state), and in some cases local (e.g., county, city, or township) taxes. Another factor contributing to the complexity of payrolls is unions, which have specific rules associated with its members. For example, union members pay dues to the union by payroll deduction, but the company pays the union these dues directly.

With regard to tracking payrolls it is important to note that some taxes may vary throughout the year because of, for example, changes to the laws. Because of these complexities, many companies in the past have relied on the services of companies that specialize in providing payroll services. For example, company A would engage company B to provide payroll services, including creating the payroll for each pay period, printing salary checks, and tracking all payrolls. The drawback with this type of arrangement is that it can be expensive for a company to use specialty companies to handle payroll functions, particularly for small to mid-sized companies.

Alternatively, companies have either purchased (commercial) computer systems or developed their own computer systems that create and track payrolls. These company-developed payroll systems and commercial payroll systems provide adequate capabilities, but also at a high cost to the small to mid-sized companies. For example, to maintain commercial systems, companies have to enter into expensive service contracts with the manufacturer of these systems. Also, these manufacturers charge companies a lot of money to alter their systems to conform to the practice needs of customers. There are also high costs involved in developing and maintaining their own payroll systems, for example, the cost of personnel, i.e., computer engineers, programmers, etc.

The human resource ("H-R") activities include the hiring of new employees, as well as keeping track of each employee's progress (advancement) while with the company. H-R activities also include tracking employee benefits, which in many instances involves deductions from each employee's salary (e.g., employee contribution to health care coverage). Another H-R activity is tracking employee salary information (payroll history) on at least a yearly basis. This H-R activity overlaps with the corresponding payroll activity, though in the past it was separated by companies from the payroll activity.

Like with their payroll activities, companies have turned to computer systems to assist with H-R activities. In this regard companies have developed their own or purchased (commercial off-the-shelf) systems tailored to H-R activities. These company-developed H-R systems and commercial H-R systems suffer from substantially the same problems as the problems with payroll systems described briefly above.

Moreover, the problem with all existing systems, both payroll and H-R, is that they fail to recognize the overlapping information used by both financial and H-R functions of a company. They fail to provide a single, integrated system that provides all information to employees and provides the accounting and H-R activities, while restricting access to, for example, alter information related only to one or the other activity.

DISCLOSURE OF THE INVENTION

Accordingly, the present invention is directed to a network-based computer software application used to secure, integrate, and manipulate both employee payroll and human resource (personnel) information. The invention facilitates the integration of employee payroll information with human resource information so that one or more network users can access or otherwise manipulate both types of information simultaneously. The invention further facilitates the tracking of user(s) changes to both employee payroll and human resource information.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve the objects of this invention and attain its advantages, broadly speaking, this invention is directed to a system for managing payroll data and human resource data for a plurality of employees, wherein the payroll data includes an employee-type and a plurality of payroll codes, and wherein the human resource data includes an employee-identifier for each of the employees, a salary for each employee, and a plurality of HR codes. The system comprises four elements. The first element stores the payroll data and the human resource data. The second element is a means for receiving user input including a pay period. The third element integrates the payroll data and the human resource data by matching the employee-type for each employee with the employee-identifier, and generates a payroll from the payroll data and the human resource data using the pay period and the salary for each employee. The last element is a means for accessing the human resource data while generating the payroll. The present invention records when a user accesses the payroll data or the human resource data, and details any change the user has made to the payroll data or the human resource data. The present invention also provides means for adding either a new payroll code or a new HR code, which adds flexibility to the system.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

FIG. 13 is a display screen image of the personnel action form data entry screen used by the preferred implementation;

BEST MODE FOR CARRYING OUT THE INVENTION

Figure 1:
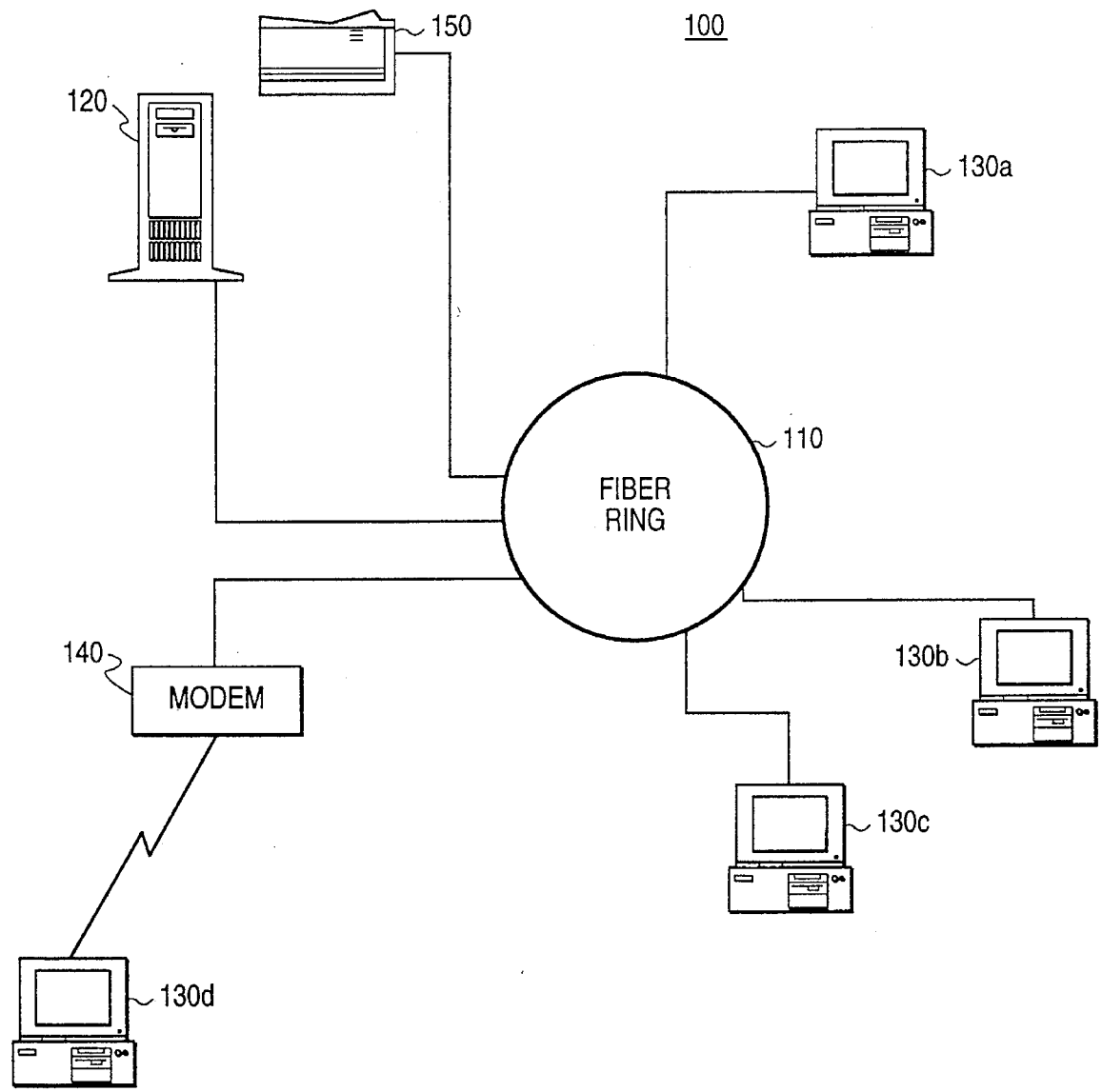
FIG. 1 is a block diagram of a network including the preferred implementation of the present invention.

Reference will now be made in detail to the preferred implementation of the present invention as illustrated in the accompanying drawings. Wherever possible, the same reference numbers will be used throughout the drawings and the following description to refer to the same or like parts.

The present invention seamlessly integrates H-R data and associated functions with payroll data and associated functions in a single system. Conventional systems handle H-R data and associated functions and payroll data and associated functions separately. The present invention, however, permits users that perform H-R functions and users that perform payroll functions in a company to perform their jobs simultaneously using a single system.

When a user generates a payroll, both payroll data and H-R data are required. The present invention takes a "snapshot" of both the payroll and H-R data it needs to produce the payroll, which is put in "in-progress tables." The payroll is calculated based on the information contained within the in-progress tables. After the payroll process is complete, information in the in-progress tables is written to various history tables. Using this strategy of in-progress tables, the present invention gives users that perform H-R and payroll functions continued access to both payroll and H-R data, even when a payroll is being created.

The present invention also includes integrated security and audit trail systems. When starting to use the present invention a user must enter an identification (ID) and password, which are assigned by the system administrator. The administrator also assigns access rights for the user. The present invention maintains a complete record of functions performed by each user, including ID, date, time, and function performed. Based on user access rights, the present invention also determines if the user has access rights to each of the menu options displayed in a menu and, if the user does have access to an option, the user is permitted to use the selected option. Otherwise, if the user does not have access to an option, the user is not permitted to select the option.

Additionally, the present invention permits users, without the aid of programmers, to alter the structure of the tables used to hold the payroll and H-R data. This permits users to add new types of data to the payroll and H-R data.

A. THE NETWORK

The present invention is preferably implemented in a network using a relational database system. Though the invention may be used with any type of network, the preferred implementation uses a local area network (LAN) running the DOS operating system. Similarly, any relational database system may be used to implement this invention, but the preferred implementation was written using CA-Clipper by Computer Associates Corp., which uses dBASE compatible relational database structures (dBASE is a product of Borland International, Inc.). Accordingly, all payroll data and H-R data used in the preferred implementation is stored in a relational database comprised of tables.

FIG. 1 shows an exemplary network 100 in which the present invention may be implemented. At the heart of the network 100 is a fiber ring 110. The fiber ring 110 may be any type of data communication link (e.g., Ethernet) used to interconnect different computers and other devices in a LAN.

The fiber ring 110 is used to directly connect together a server 120, personal computers 130a, 130b, and 130c, modem 140, and printer 150. The modem 140 may be any type of conventional modem that permits a personal computer 130d to connect to the network 100 via a communication line (e.g., conventional telephone lines or cellular or satellite communication links).

Each of the personal computers 130a–d includes a display, a microcomputer with disk drives, and keyboard or other input device (not shown). The server 120 may also be any type of conventional network server. In the preferred implementation, the server 120 is an IBM-PC compatible computer running the Netware network operating system by Novell, Inc. Finally, in the preferred implementation the printer 150 is a high speed, wide carriage dot matrix printer, though other conventional printers may also be used with the present invention.

Figure 2:
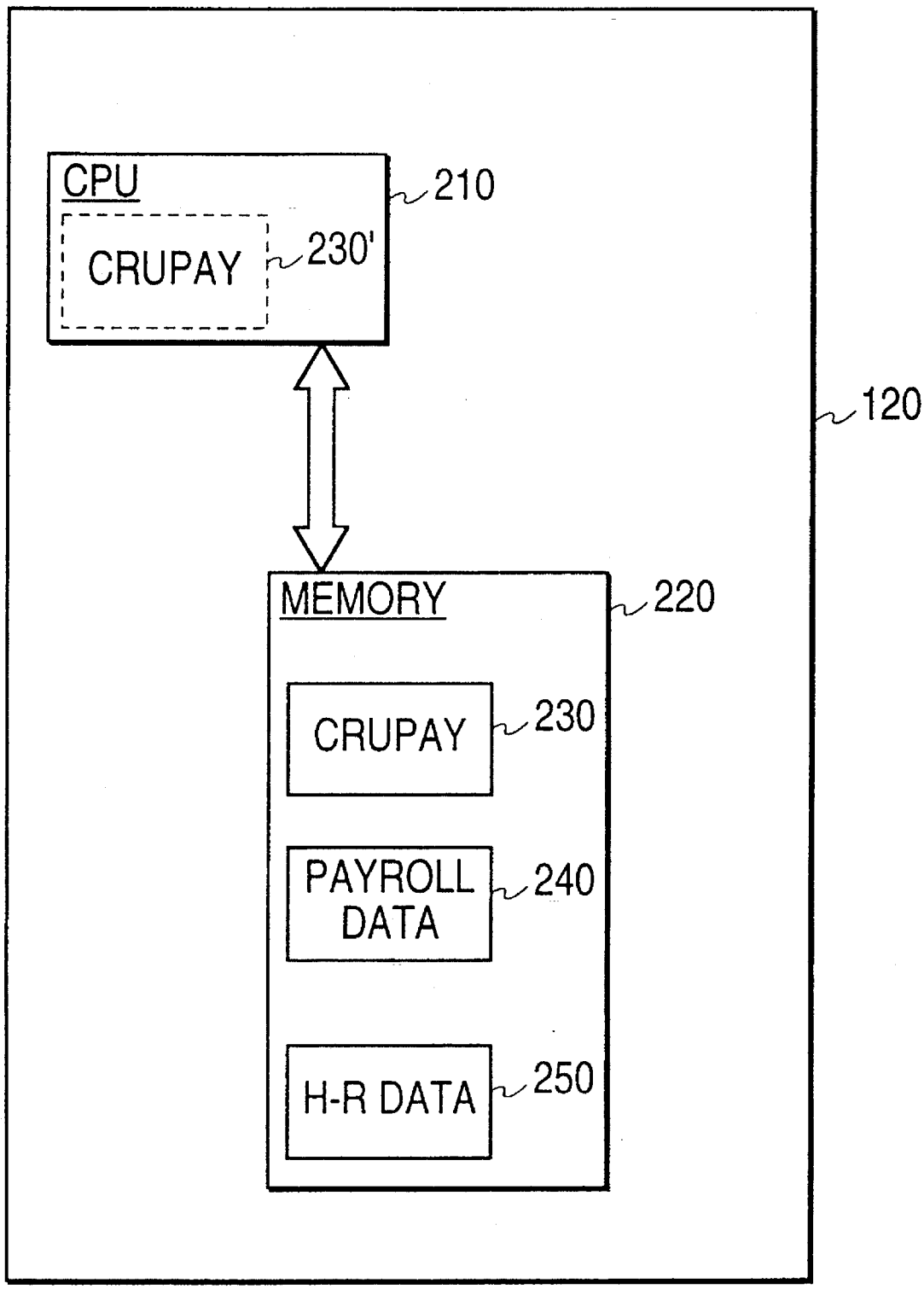
FIG. 2 is a block diagram of a part of the server included in the network of FIG. 1.

FIG. 2 shows a portion of the server 120 including a central processing unit (CPU) 210 and a memory 220. CPU 210 can be any standard and commonly known central processing unit, and memory 220 can include magnetic core, semiconductor RAM, magnetic disks and magnetic tapes, or any other known memory device. CPU 210 can also represent several independently running central processing units which may be executing application programs simultaneously. As shown in FIG. 2, an application program, CRUPAY 230, is stored in memory 220 and may be executed by the CPU 210. This is illustrated by CRUPAY 230' in CPU 210. Also included in the memory 220 are payroll data 240 and H-R data 250. When operating in the CPU 210, CRUPAY 230' uses the payroll data 240 and H-R data 250 from the memory 220. Since the preferred implementation uses a relational database to store the payroll data 240 and H-R data 250, the data 240 and 250 are stored in tables.

B. COMPONENTS OF CRUPAY

Figure 3:
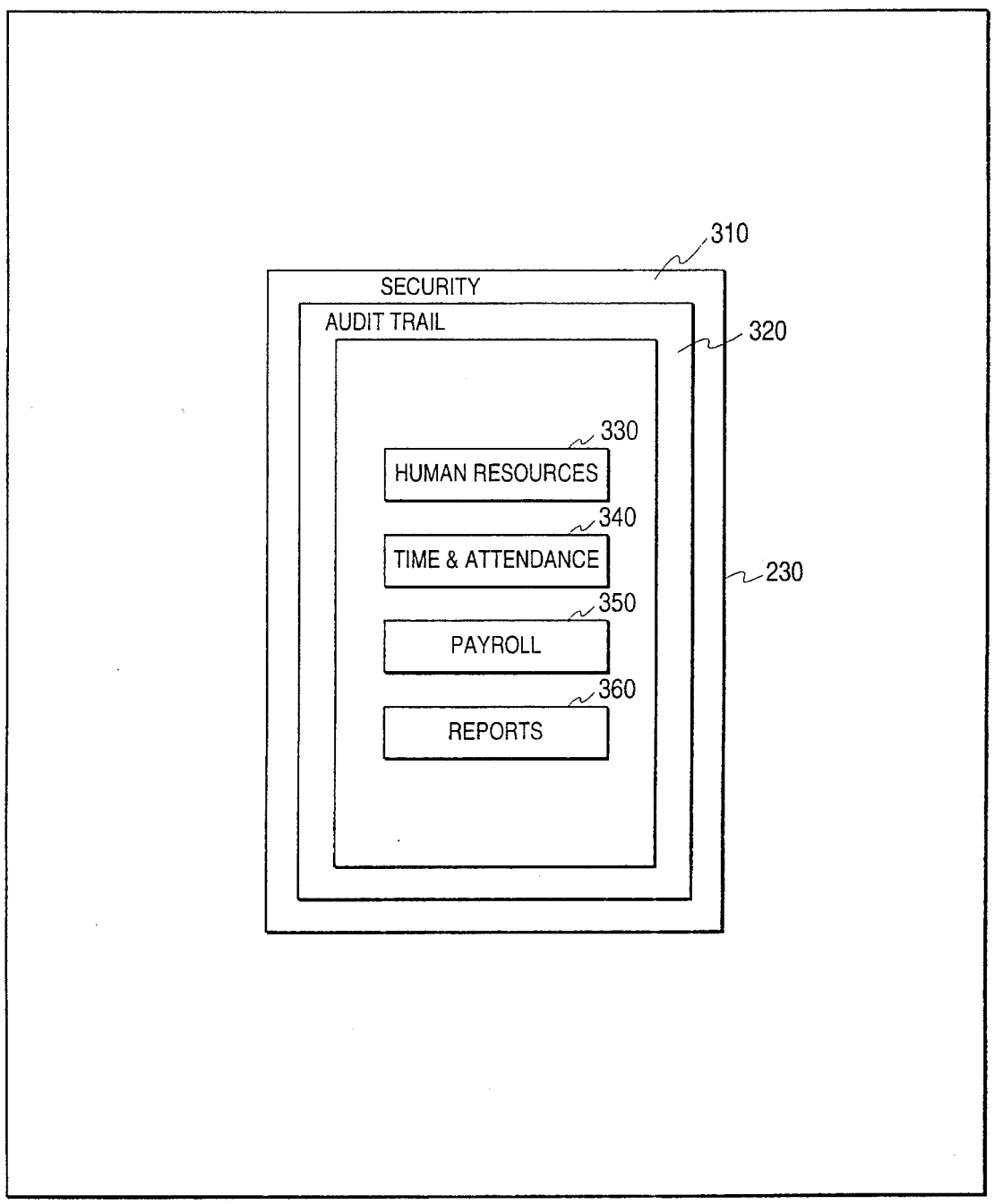
FIG. 3 is an illustration showing various components of the preferred implementation.

As shown in FIG. 3, CRUPAY 230 comprises six software components: Security 310, Audit Trail 320, Human Resources 330, Time & Attendance 340, Payroll 350, and Reports 360. Each of these components performs specific functions when CRUPAY 230' is executing in the CPU 210. These functions will be described in greater detail below.

In general, the Security component 310 provides application security operations, and the Audit Trail component 320 records functions performed by each user. The Human Resources component 330 provides H-R operations, and the Time & Attendance component 340 enables users to enter time-card information. The Payroll component 350 enables users to generate a payroll (i.e., employee payroll checks). The Reports component 360 is used by both the Human Resources and Payroll components 330 and 350 to provide general reporting capabilities on all information (both payroll and H-R data) maintained by CRUPAY 230. For example, Reports component 360 enables users to generate different H-R reports required by various government agencies (e.g., report on hiring minorities).

The preferred implementation is a menu-based software application that displays on the display screen of the computer (e.g. personal computer 130a) a plurality of different menus and data entry forms. Users select options from the displayed menus using the cursor control keys on standard keyboards (e.g., the keyboard for personal computer 130a) to highlight a selected option and then striking the enter key to select the option. Users enter data in displayed data entry forms by using the tab key to scroll through the fields of data entry forms and entering (typing) information in appropriate fields. Additionally, some of the data entry forms have simultaneously displayed menus. With these types of forms the cursor control keys may be used to select the menu options in the same manner that the cursor controls keys are used to select options from other types of menus.

C. SECURITY COMPONENT

Figure 4:
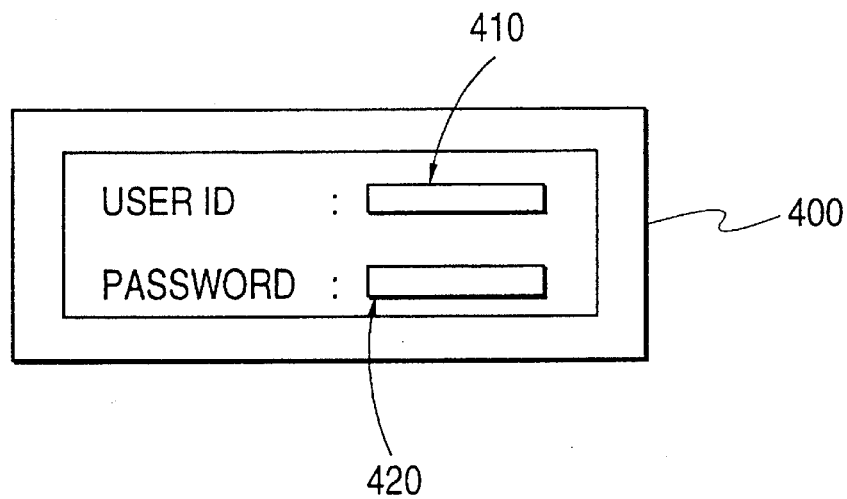
FIG. 4 illustrates a display screen image used for security purposes in the preferred implementation.

Each time a user begins using CRUPAY 230, the user must enter a User ID and Password. FIG. 4 illustrates the security check display 400 that the Security component 310 of CRUPAY 230 displays on the display screen of a computer, e.g., the display screen of a personal computer 130. When this display 400 is displayed, the user enters a User Id in field 410 and a Password in field 420. The Security component 310 of CRUPAY 230 maintains tables that identify all users by User ID and Password. This way CRUPAY 230 only permits certain users (those listed in the tables) access to the CRUPAY 230 components 320–360.

The Security component 310 also maintains a table (called the access level table) that includes information concerning the level of data access permitted to each user. This table is used to permit only certain users capability to access (read only, read and write) payroll data or to access H-R data, while other users may access both types of data. A system administrator maintains the User ID-Password tables as well as the access level table. Thus, only the system administrator can permit new users access to CRUPAY 230 or change a user's access level.

D. AUDIT TRAIL COMPONENT

The audit trail component 320 uses the access level table (maintained by the Security component 310) to determine which menu options on each of the Main Menu 500 (illustrated in FIG. 5)—Payroll Menu 700 (illustrated in FIG. 7), Human Resources Menu 1200 (illustrated in FIG. 12), Time & Attendance Menu 1400 (illustrated in FIG. 14), Utilities Menu 1500 (illustrated in FIG. 15), and System Codes Menu 1600 (illustrated in FIG. 16)—users may select. For example, when a user that only has access (either read or read and write) to payroll data and associated functions, the Audit Trail component 320 limits access from the Main Menu 500 (FIG. 5) to only selection items Time & Attendance 520, Payroll 530, Systems Utilities 540, and Quit 550, excluding Human Resources 510. When the user selects Quit 500, CRUPAY 230 completes executing. However, when a user selects Human Resources 510, Time & Attendance 520, Payroll 530, or Systems Utilities 540 from the Main Menu 500, a corresponding component of CRUPAY 230 begins executing. When a user selects one of items 510–540 from the Main Menu 500, the Audit Trail component 320 continues executing simultaneously with the selected component.

The Audit Trail component 320 registers each user as an active user after successfully passing the security component 310. From that moment until the user exits CRUPAY 230 (Quit 550 on Main Menu 500), a complete record of functions performed is stored by the Audit Trail component 320 in an audit trail table, including the User ID, date, time, and function performed. This enables CRUPAY 230 users to identify, for example, the user(s) that previously altered the payroll and/or H-R data. For example, a user may access CRUPAY 230 and select Payroll 530 from the Main Menu 500 to produce a payroll (including printing payroll reports and checks), but finds that, after reviewing the payroll an error occurred. To locate the source of the error, the user can review the audit trail table to identify the User ID, date, time, and function performed that caused the error.

Figure 6:
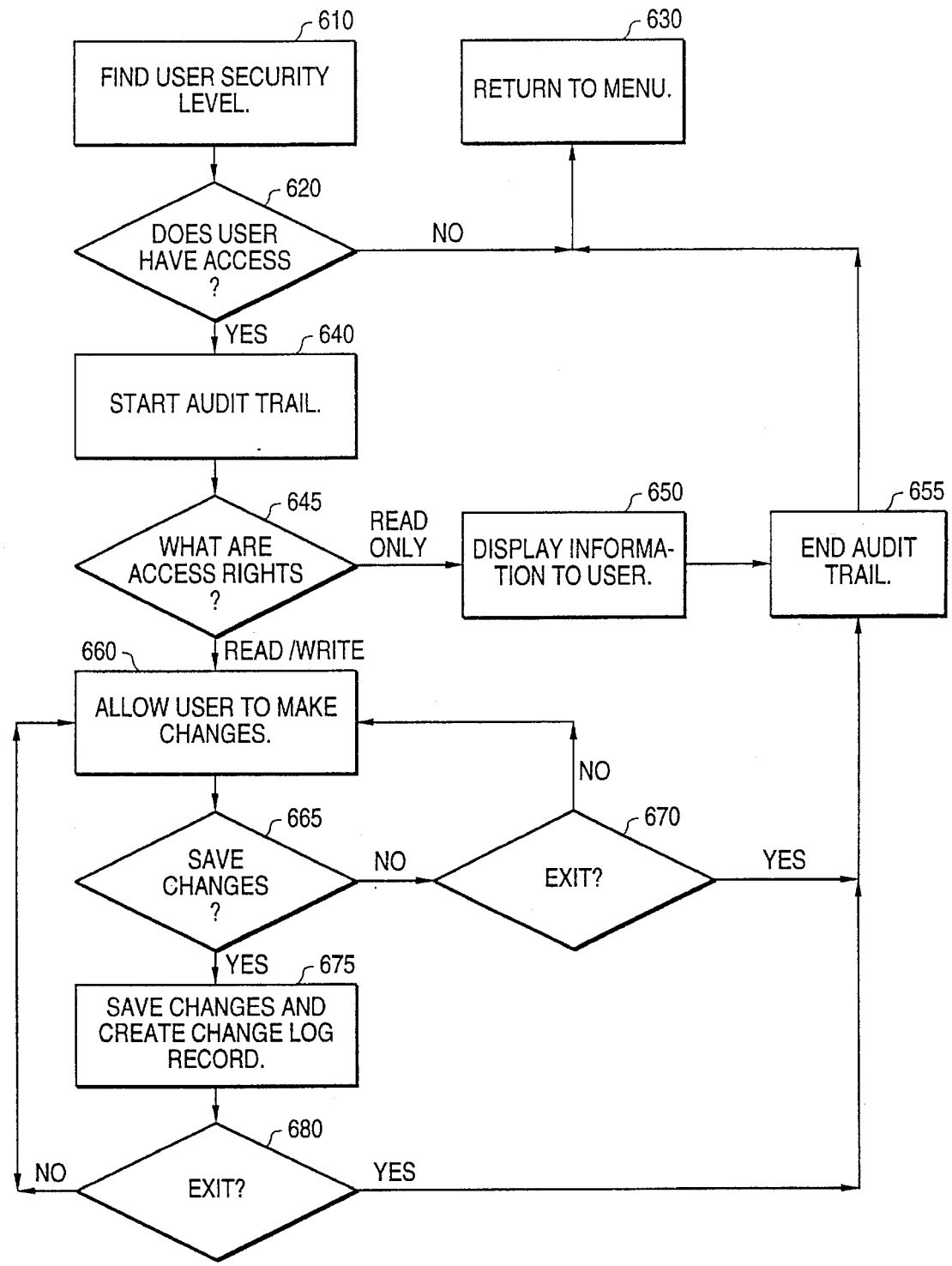
FIG. 6 is a flow diagram of the audit trail component of the preferred implementation.

FIG. 6 shows a flow diagram of steps in the audit trail process 600 used by the Audit Trail component 320 of CRUPAY 230. When a user selects an option from the Main Menu 500, the Audit Trail component 320 first accesses the access level table to find the security level for the user (step 610). If the user does not have access to the selected option, then the Audit Trail component 320 does not permit the user to access the selected option, but returns to display the previously displayed menu, in this case the Main Menu 500 (step 630). For example, a user with only access rights to payroll data will not be permitted access to H-R data and related functions of CRUPAY 230. Thus, the Audit Trail component 320 will not permit the user to successfully select the Human Resources option 510 from the Main Menu 500.

Because the Audit Trail component 320 is simultaneously running with all other components of CRUPAY 230 (except the security component 310), the Audit Trail component 320 restricts user selections from all menus and displayed data entry forms (discussed below).

If, on the other hand, the user does have access to a selected menu option, then the Audit Trail component 320 begins to track the audit trail of the user (step 640). First, the Audit Trail component 320 determines what level of access rights the user has, i.e., read only or read and write (step 640). If the user has read only access, then the Audit Trail component 320 permits the user to view any data. For example, if the user has read only access to payroll data, the user would be permitted to select Payroll 530 from the Main Menu 500 and then to select any of the options displayed in the Payroll Menu 700 (FIG. 7) and view payroll data (step 650). After viewing selected data (step 650) the Audit Trail component 320 completes tracking the audit trail of the user with read only access rights (step 655) and returns to the previously displayed menu (step 630).

If the user has both read and write access rights (step 645) then the Audit Trail component 320 permits the user to make any changes to any data to which the access rights apply (step 660). For example, a user with read and write access rights to H-R data not only can view existing data that may be displayed in the Personnel Action Form 1300 (FIG. 13), but also change any H-R data, including data displayed in the form 1300.

If the user wishes to save any changes to payroll or H-R data (step 665) then the Audit Trail component 320 saves the changes and creates a change log record in the audit trail table to reflect the saved changes (step 675). If the user has completed making changes, then the flow continues to step 655, otherwise flow returns to step 660. If the user does not wish to save the changes (step 665), the Audit Trail component 320 determines whether or not the user wishes to exit (step 670). If the user does not wish to exit (step 670), the Audit Trail component 320 permits the user to save changes (step 660). Otherwise the flow continues to step 655.

E. PAYROLL COMPONENT

Figure 7:
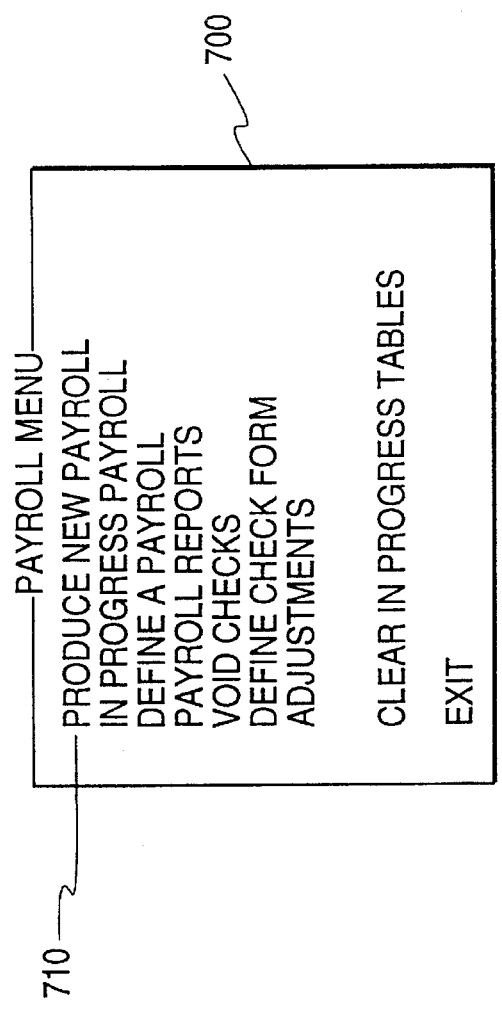
FIG. 7 illustrates a display screen image of the payroll menu used by the preferred implementation.

Payroll component 350 includes the functions associated with producing payrolls. To initiate execution of the payroll component 350, a user highlights the Payroll option 530 on the Main Menu 500 and strikes the enter key. (Alternatively, the user may select the Payroll option 530 by striking the character "p" on the keyboard.) When selecting the Payroll option 530, the user initiates execution of the Payroll component 350, which begins by displaying a Payroll Menu 700 (FIG. 7).

The Payroll Menu 700 includes nine menu options, including the option to Produce New Payroll 710. (The other eight are: In Progress Payroll, Define A Payroll, Payroll Reports, Void Checks, Define Check Form, Adjustments, Clear In Progress Tables, and eXit. The function of each of these options can be generally understood by the name of the option. For example, the Void Checks option permits the user to void checks printed by CRUPAY 230).

Figure 11:
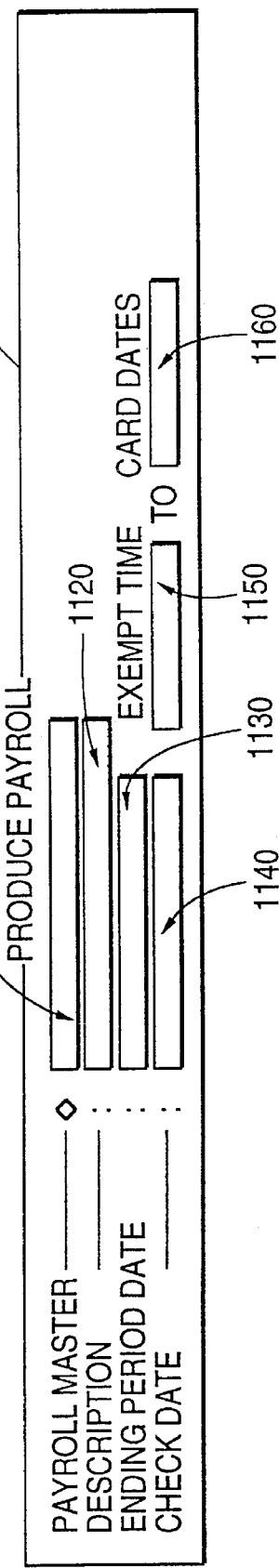
FIG. 11 is a display screen image of the product payroll data entry screen used by the payroll component of the preferred implementation.

The user selects Produce New Payroll 710 to instruct the Payroll component 350 to begin to create a new payroll. Selecting this option causes the Payroll component 350 to display the Produce Payroll entry form 1100 (FIG. 11). In this entry form, users enter the information needed to create a payroll. In field 1110, the user identifies the Payroll Master. The Payroll Master is the type of payroll the user wishes to create. For example, companies have many types of union and nonunion personnel. The payroll for each of these types of personnel is different. Therefore, different payrolls must be created for each of these types of personnel. The Payroll Master field 1110 permits the user to select the type of payroll template used to produce a payroll. In the Description field 1120 the user enters a description of the payroll that is going to be produced (e.g., a semi-monthly payroll for September 1 to September 5 paid on September 16). The Ending Period Date field 1130 is where the user enters the ending period of the payroll. The ending period date is used to determine which time cards to use to produce the payroll. This is used mainly for union and non-exempt payrolls. The Check Date field 1140 is where the user enters the date to be printed on checks, and the Exempt Time Card Dates fields 1150 and 1160 are used to enter dates to determine which time cards to use to produce the payroll. These fields are used mainly for exempt and key executive payrolls. The preferred implementation include these two sets of dates because union and non-exempt employees are always paid for a set period of time that always starts on Monday and ends on Sunday, but exempt and key executives are paid based on a variable schedule.

Figure 8:
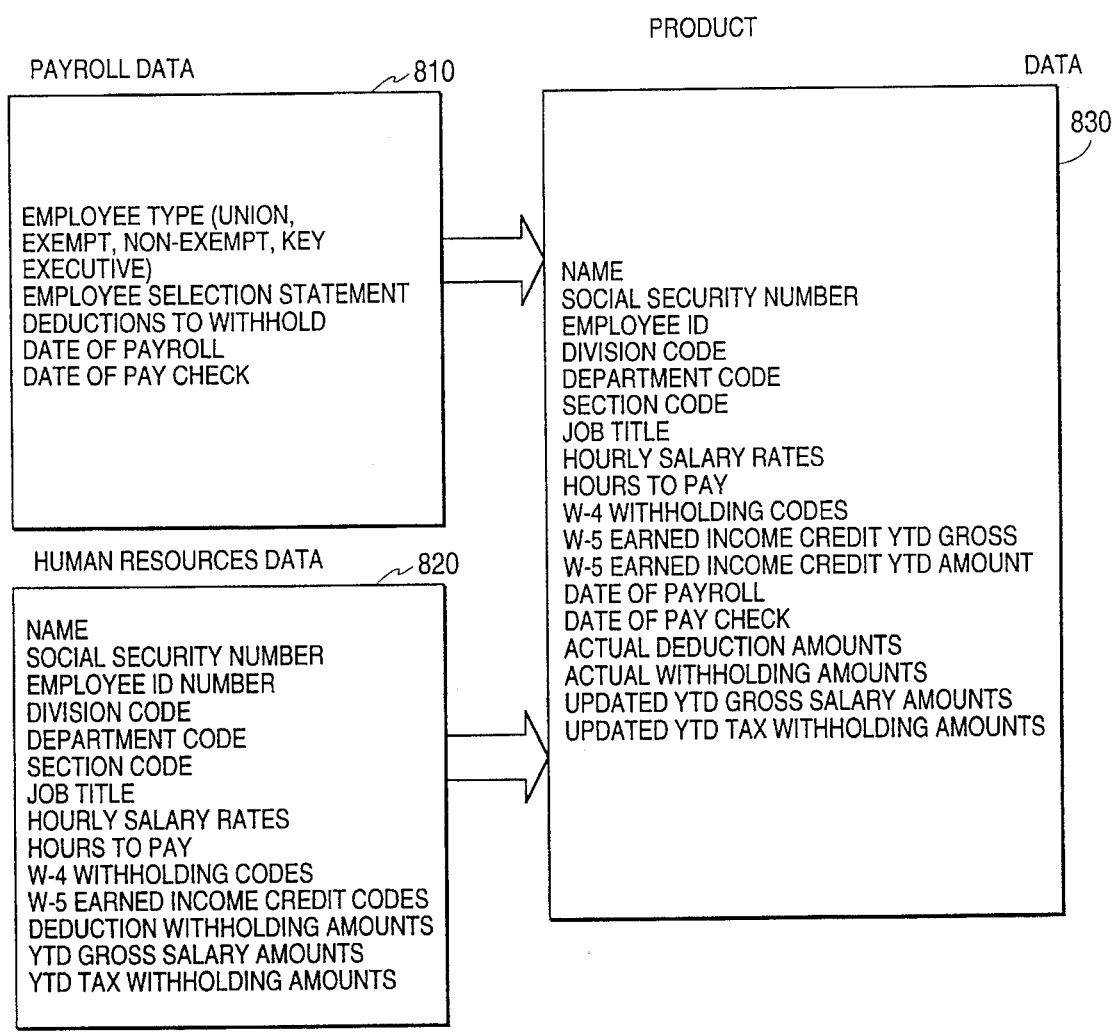
FIG. 8 shows several types of information categorized as payroll data and H-R data, as well as the type of information included in the product of combining the payroll data and H-R data, which product is produced by the preferred implementation.

FIG. 8 illustrates the payroll data 810 and the H-R data 820 that CRUPAY 230 uses to produce a payroll, which is represented in FIG. 8 by product data 830. The payroll data includes the employee type (which may be union, exempt, nonexempt, key executive) employee selection statements, deductions to withhold, date of payroll, and date of paycheck. The employee selection statement are used to determine which employees to include in a payroll. For example, an employee selection statement might be: Division= "CSCD" (a particular division name) and Department= "910" (a particular department number). This statement is used to produce a payroll according to the limitations in the statement. Another example might be: Division="CSCD"

and SSN (social security number) not equal to "111-22-3333".

CRUPAY 230 maintains H-R data for each employee. The H-R data 820 used to generate a payroll includes, for each employee, the employee's name, social security number, employee ID number, division code, department code, section code, job title, hourly salary rates, hours to pay, W-4 withholding codes, W-5 earned income credit codes, deduction withholding amounts, year to date gross salary amounts, and year to date tax withholding amounts. These will be described below.

The product data 830 includes, for each employee included in the payroll, the employee's name, social security number (SSN), employee ID number, division code, department code, section code, job title, hourly salary rates, hours to pay, W-4 withholding codes, W-5 earned income credit year to date gross, W-5 earned income credit year to date amount, date of payroll, date of paycheck, actual deduction amounts, actual withholding amounts, updated year to date gross salary amounts, and updated year to date tax withholding amounts The employee's name includes the first and last name for each employee in the payroll. The employee ID number is, for example, an employee clock number, which is a unique identifier (other than the SSN) for each employee.

The division code, department code, and section code, together identify each employee's work location. The division code corresponds to the division in which each employee in the payroll works, and the department code identifies the department in which the employee works. Each employee also works in a particular section. This is identified by the section code.

The hourly salary rate is the amount the employee is paid per hour of work. This rate is made up of three components: a regular rate, an overtime rate, and a special hourly rate. Hours to pay comprises the total number of hours specified in an employee's time card. This is broken down into 6 components: regular hours, overtime hours, vacation hours, holiday hours, sick hours, and special hours.

The W-4 withholding codes specify the employee's claimed exemptions as well as additional amounts to withhold for taxes. Codes exist for federal, state, local, and city taxes.

The W-5 earned income credit year to date (YTD) gross specifies the employee's earned income credit (EIC) for the year to date (within a gross amount limit), and the W-5 earned income credit year to date amount is the employee's total EIC for the year to date. There is a limit on the amount of EIC that can be collected each year, and the preferred implementation accounts for this when generating a payroll.

The date of payroll is the date the payroll was created, and the date of paycheck is the date to be printed on the employee's pay check. The actual deduction amount is computed based on the deduction master for this payroll, the deductions an employee has claimed, and the deduction master table. The actual withholding amount is calculated from the employee's W-4 codes and the federal, state, local, and city tax tables. The updated year to date gross salary amount is the employee's salary to date before taxes (calculated by the W-4 codes), and updated year to date tax withholding amounts is the amount the employee has paid in taxes to date (calculated by the W-4 codes).

Figure 9:
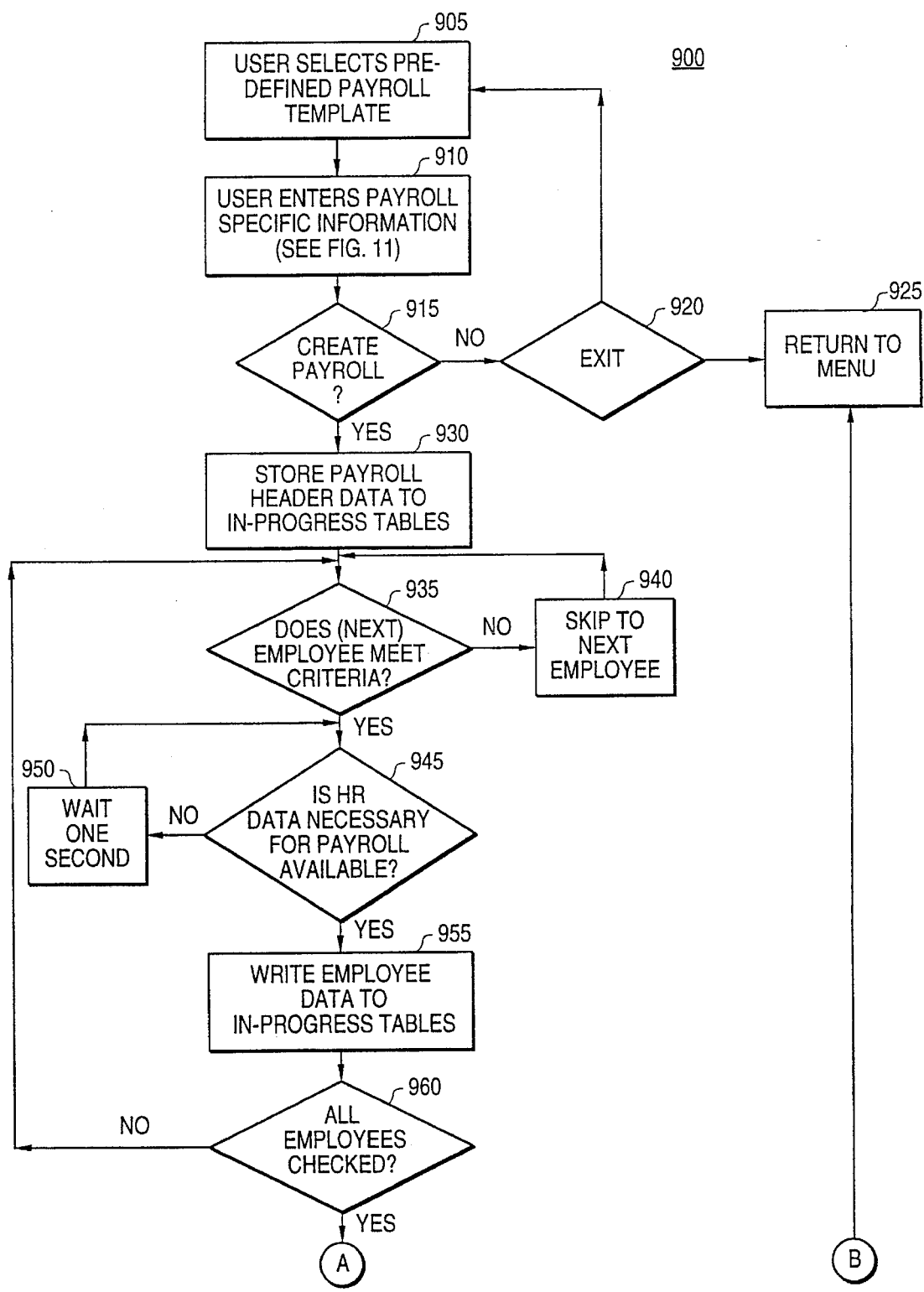
FIG. 9 is a flow diagram of the process used to create a payroll by the payroll component of the preferred implementation.

To integrate the payroll data 810 with the H-R data 820 to produce the product data 830, the Payroll component 350 performs the steps of the produce payroll process 900 illustrated in FIG. 9. In step 905, the user selects one of a plurality of predefined payroll templates (step 905). The user then enters payroll specific information in step 910 (see the produce payroll entry form 1100 illustrated in FIG. 11).

If the user does not wish to create a payroll (step 950), the Payroll component 350 determines whether the user wishes to exit the Produce New Payroll option 710 from the Payroll Menu 700 (step 920). If the user wishes to exit, then the Payroll component 350 returns and displays the Payroll Menu 700. If, however, the user does not wish to exit (step 920), then the payroll component 350 returns the flow to step 905.

If the user wishes to create a payroll (step 915), then the Payroll component 350 stores the payroll header data (information from the produce payroll entry sheet 1100) in "in-progress tables" (step 930). As described above, the in-progress tables are used to store a "snap shot" of the H-R data so that users may access the H-R data while the Payroll component 350 is producing a payroll.

The Payroll component 350 then begins a loop checking the H-R data corresponding to each employee to determine whether the employee should be included in the payroll that the user wishes to create (steps 935–960). In step 935, the Payroll component 350 determines whether employee meets the criteria set forth in the header data of the in-progress tables. If the employee does not meet the criteria (step 935), then the Payroll component 350 skips the H-R data for that employee (step 940) and returns to step 935 to check whether the H-R data for the next employee meets the criteria (step 935). If yes, then the Payroll component 350 determines whether the H-R data that is necessary for creating the payroll is available (step 945). If the H-R data is not available (step 945), then the Payroll component 350 waits one second (step 950) and then returns to step 945. The H-R data for an employee may not be available if another user is updating that H-R data. In this case it is important that the Payroll component 350 use the most current H-R data, so it waits the one second for the H-R data.

Figure 10:
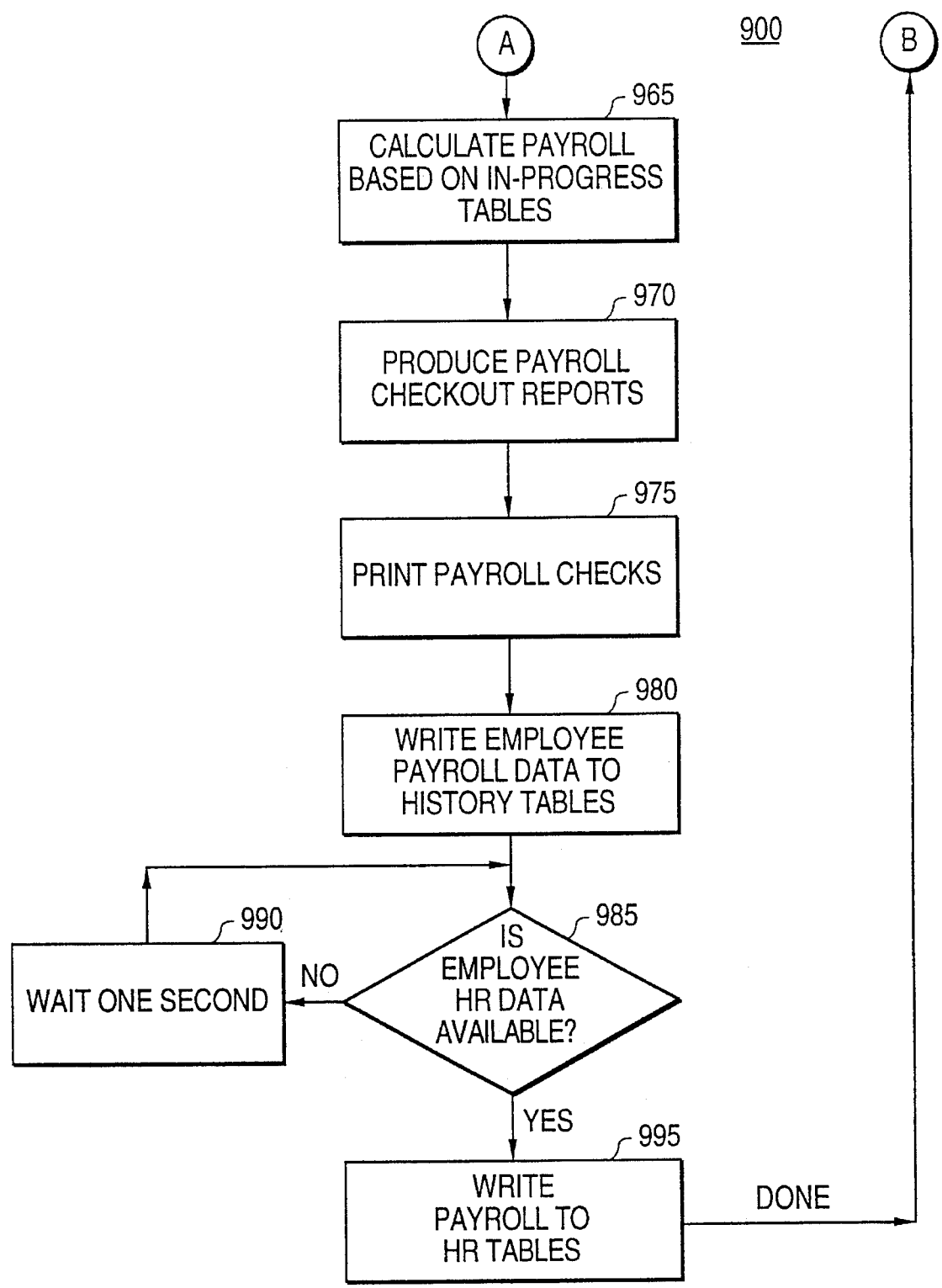
FIG. 10 is a flow diagram of the process used to create a payroll by the payroll component of the preferred implementation (continued from FIG. 9)

When the H-R data is available (step 945), the payroll component writes the H-R data for the employee into the in-progress tables (step 955). The Payroll component 350 then determines whether the H-R data for all employees has been checked (960). If not, then the loop returns to step 935. Otherwise, the Payroll component 350 has checked all employees (step 960) and the processing continues to step 965 of FIG. 10.

In step 965, the Payroll component 350 calculates the payroll based on the in-progress tables. The Payroll component 350 then produces payroll checkout reports (970) that a user can use to determine whether the payroll is correct. The Payroll component 350 may then print payroll checks (step 975), after which it will write the payroll data for each employee to history tables maintained by CRUPAY 230 (step 980). The Payroll component 350 then determines whether the H-R data is available (step 985). (The H-R data may not be available if another user is using, i.e., updating the H-R data.) If the H-R data is not available (step 985), then the Payroll component 350 will wait one second (step 990) and then return to step 985. Otherwise, the Payroll component 350 will write the payroll to the H-R data to update the H-R data to reflect the year to date totals from the payroll. After completing step 995, the Payroll component 350 returns to step 925 and then to display the Payroll Menu 700.

Using this process 900 to produce a payroll, other users may simultaneously access payroll and H-R data while CRUPAY 230 creates the payroll. In this manner CRUPAY 230 seamlessly integrates payroll data (and related functions) with H-R data (and related functions).

F. HUMAN RESOURCES COMPONENT

Figure 5:
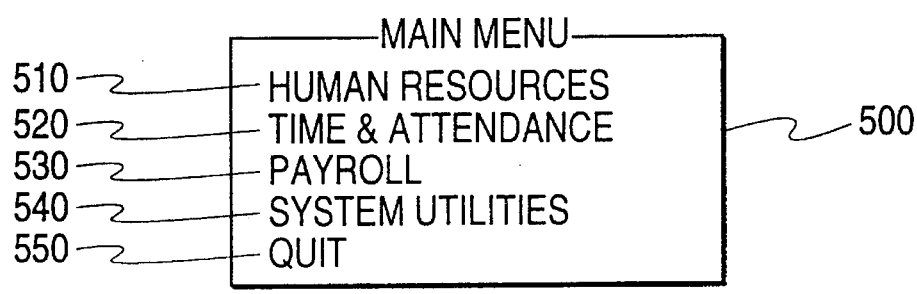
FIG. 5 illustrates a display screen image of the main menu used by the preferred implementation.
Figure 12:
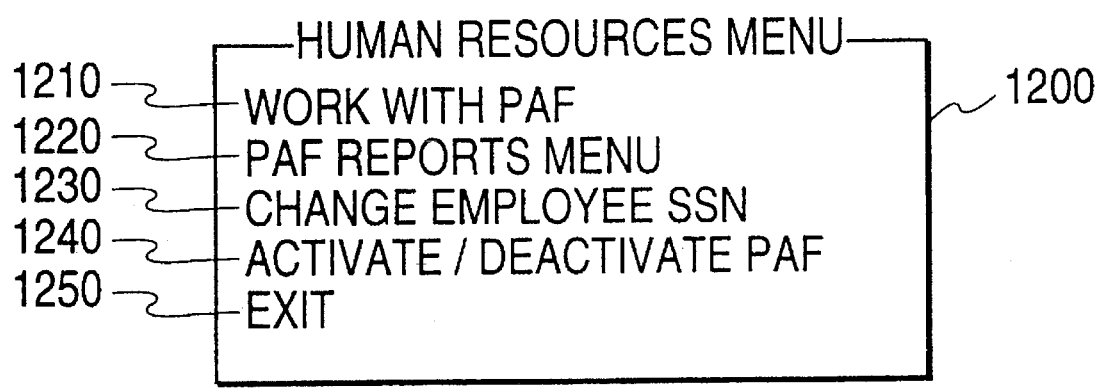
FIG. 12 illustrates a display screen image of the human resources menu used by the preferred implementation.

To initiate processing of the Human Resources component 330, the user selects the Human Resource option 510 from the Main Menu 500 (FIG. 5). This selection causes the Human Resources component 330 to display the Human Resources Menu 1200 (FIG. 12). The menu 1200 includes five options: Work With PAF (Personnel Action Form) 1210, PAF Reports Menu 1220, Change Employee SSN (social security number) 1230, Activate/Deactivate PAF 1240, and eXit 1250. When the user selects any of these options, the Human Resources component 330 of CRUPAY 230 begins executing the corresponding function. For example, selecting the Work With PAF option 1210 from the Human Resources menu 1200 causes the Human Resources component 330 to display a portion of the Personnel Action Form data entry display 1300 (FIG. 13) along with a related menu 1480.

Using the displayed entry form 1300, the user views or changes the H-R data for an employee or adds H-R data for a new employee. In field 1305, the user enters the name of an employee (last name, first name, middle name). In field 1310, the user enters the country in which the employee is employed and in field 1315, the user enters the employee's number. In field 1320, the user enters the employee's social security number, and, in field 1325, the user enters the employee's birth date. Field 1330 specifies the employee's age, which is calculated based on the employee's birth date, and in fields 1335, 1340, 1345, and 1350, the user enters the employee's home address, including street address, city, state, and zip code, respectively. In field 1355, the user enters the employee's phone number, in field 1360, the user enters the employee's sex, and in field 1365, the user enters the employee's ethnic background. In field 1370, the user enters data indicating whether the employee is married, and, in field 1375, the user enters the employee's citizenship.

Field 1380 is used to specify whether the employee is disabled and field 1385 is used to specify whether or not an employee is a veteran. Field 1390 is used to specify whether the employee is in the reserves and field 1395 is used to further specify an employee's reserve status (active, inactive). In field 1450, the user specifies whether the employee is a member of a union, including the identity of the union. Fields 1450–1455 only relate to union employees. In field 1455 the user specifies when the employee joined the union, and in field 1465 the user specifies the date the employee began working for the company. In field 1460, the user enters the seniority date. In most cases, the seniority date will be the same as the employment date. It would, however, differ from the employment date if the employee left the company and then returned, in which case, the employment date would be the same (date employee began employment), but the seniority date would reflect the date the employee's return date. Finally, in field 1475, the user enters the direct deposit account number for the employee.

The Human Resources component 330 also displays with the Personnel Action Form 1300, a menu 1480, which may be used to select and access different portions of the Personnel Action Form 1300. Selecting any of these items can easily be done by highlighting the selected item using the cursor control keys on the keyboard and pressing enter after the selected item is highlighted. The Human Resources component 330 permits users to update H-R data while other users are simultaneously viewing the same H-R data. Additionally, the payroll component 350 (as explained above) uses the H-R data managed by the human resources component 330 when producing a new payroll. In this way, users can access the H-R data using the human resources component 330 at the same time the payroll component 350 access the H-R data. This is accomplished (as explained above) using in-progress tables.

Figure 15:
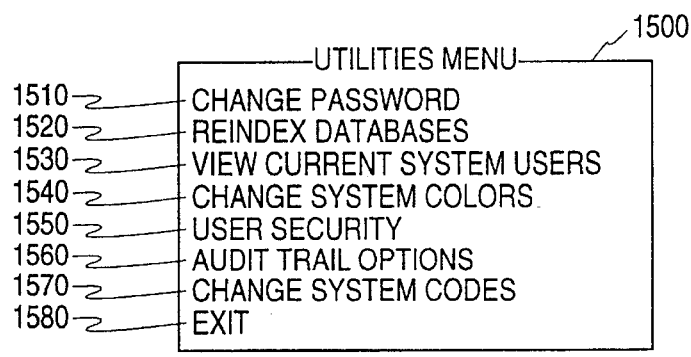
FIG. 15 illustrates a display screen image of the utilities menu used by the preferred implementation.
Figure 16:
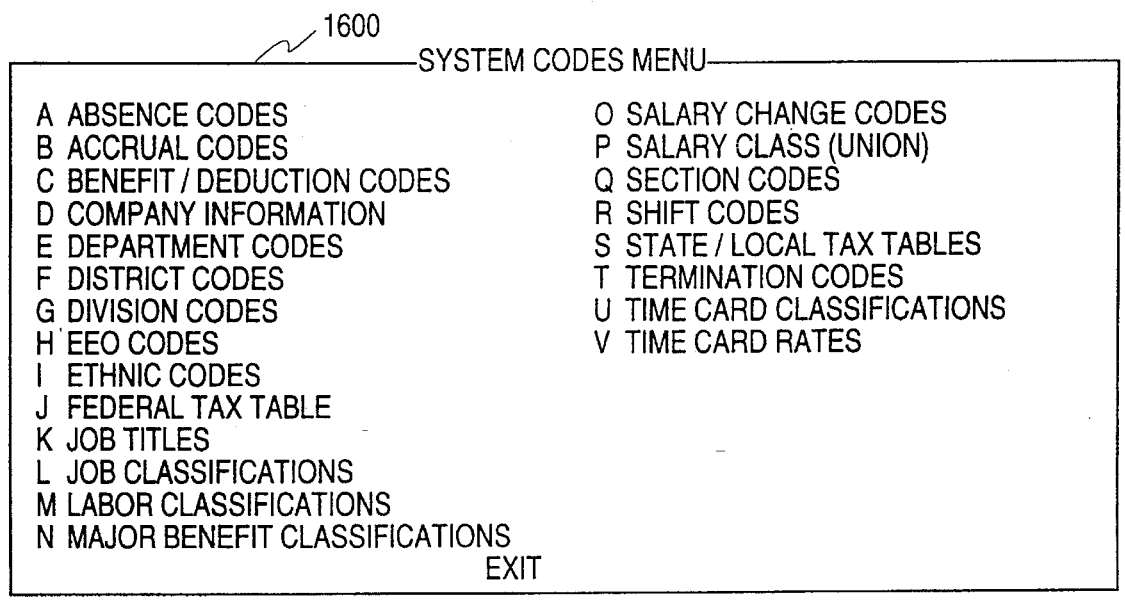
FIG. 16 illustrates a display screen image of the system codes menu used by the preferred implementation.

CRUPAY 230 also provides processes common to both the Payroll and Human Resources component 330 and 350. One such process is used to change the structure of tables (payroll data and H-R data) maintained by CRUPAY 230. (This is also referred to as changing codes in the payroll data and H-R data.) FIG. 15 illustrates the Utilities Menu 1500. The menu 1500 includes eight options: Change Password 1510, Reindex Databases 1520, View Current System Users 1530, Change System Colors 1540, User Security 1550, Audit Trail Options 1560, Change System Codes 1570, and eXit 1580. Like all other menus in CRUPAY 230, selecting an option from the utilities menu 1500 causes CRUPAY 230 to perform the corresponding function. For example, selecting option 1570 from the Utilities Menu 1500 causes CRUPAY 230 to display the System Codes Menu 1600 illustrated in FIG. 16. Users select items from the System Codes Menu 1600 to alter the codes included in both the payroll data and H-R data maintained by CRUPAY 230. Accordingly, each of the Human Resources and Payroll components 330 and 350 include a system codes process 1900 (FIGS. 18 and 19) used to change the structure of tables relating to the H-R data and payroll data.

Figure 17:
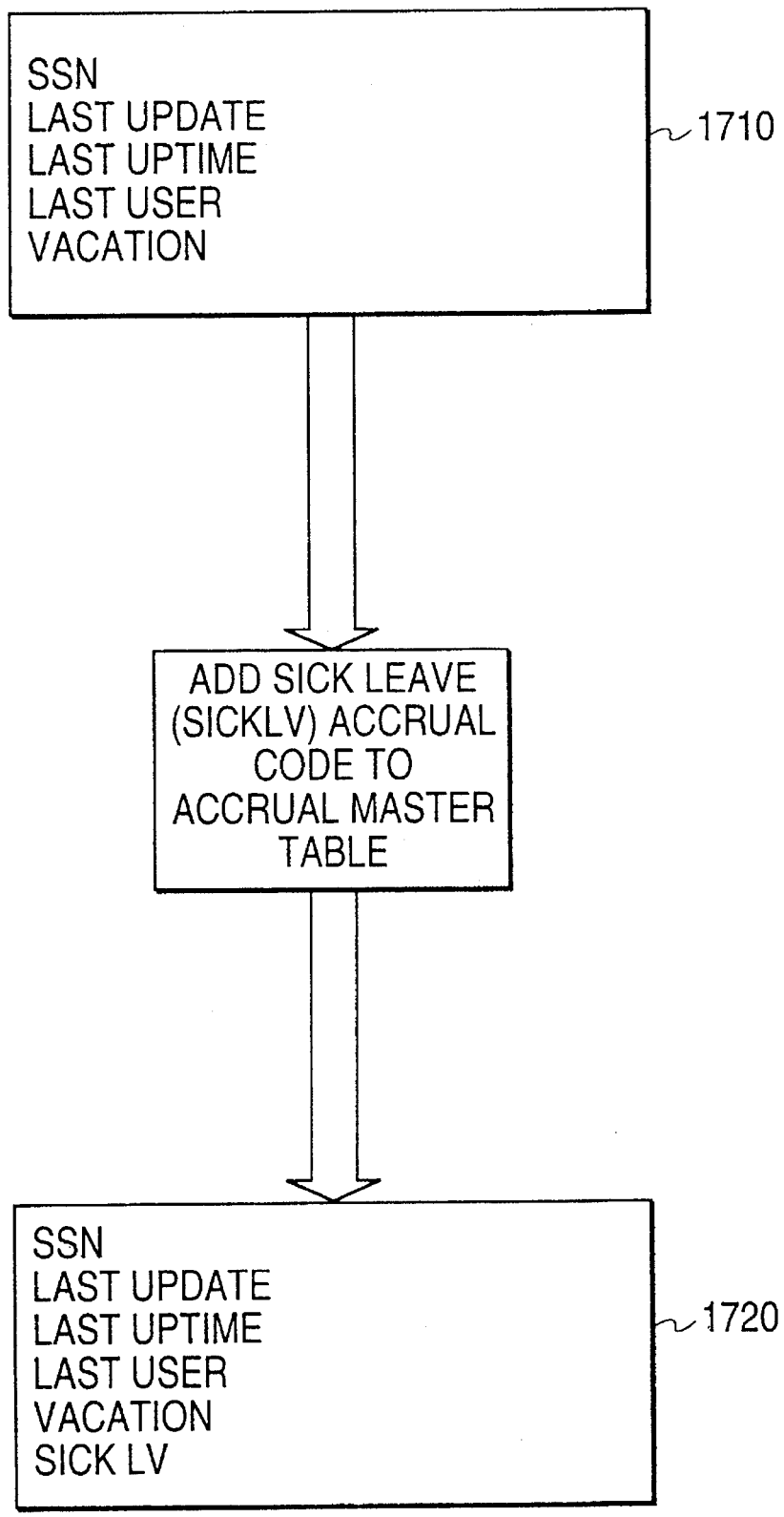
FIG. 17 shows that employee accrual master table structure before and after the preferred implementation changes the accrual master table.

FIG. 17 illustrates an example of how the change system codes process 1900 of the Human Resources component 330 of CRUPAY 230 changes the tables for H-R data to add an additional code for each employee. An example of the structure of the employee accrual master table 1710 is illustrated in FIG. 17. The table includes an employee's SSN (social security number), LASTUPDATE, LASTUPTIME, LASTUSER, and VACATION. The LASTUPDATE is the last date the record was changed and the LASTUPTIME is the time that the last up date was made. The LASTUSER identifies the user responsible for making the last up date. Lastly, VACATION corresponds to the vacation hours accrued for each employee.

In this example, the user wishes to add a field to the table 1710 for sick leave (SICKLV) in the accrual master table. Thus, after the change system codes process 1900 of the Human Resources component 330 adds SICKLV to the employee accrual master table 1710, the table 1720 includes all of the items previously included in the table 1710 with the addition of a field for SICKLV. This is illustrated in FIG. 17 by the table structure 1720.

Figure 18:
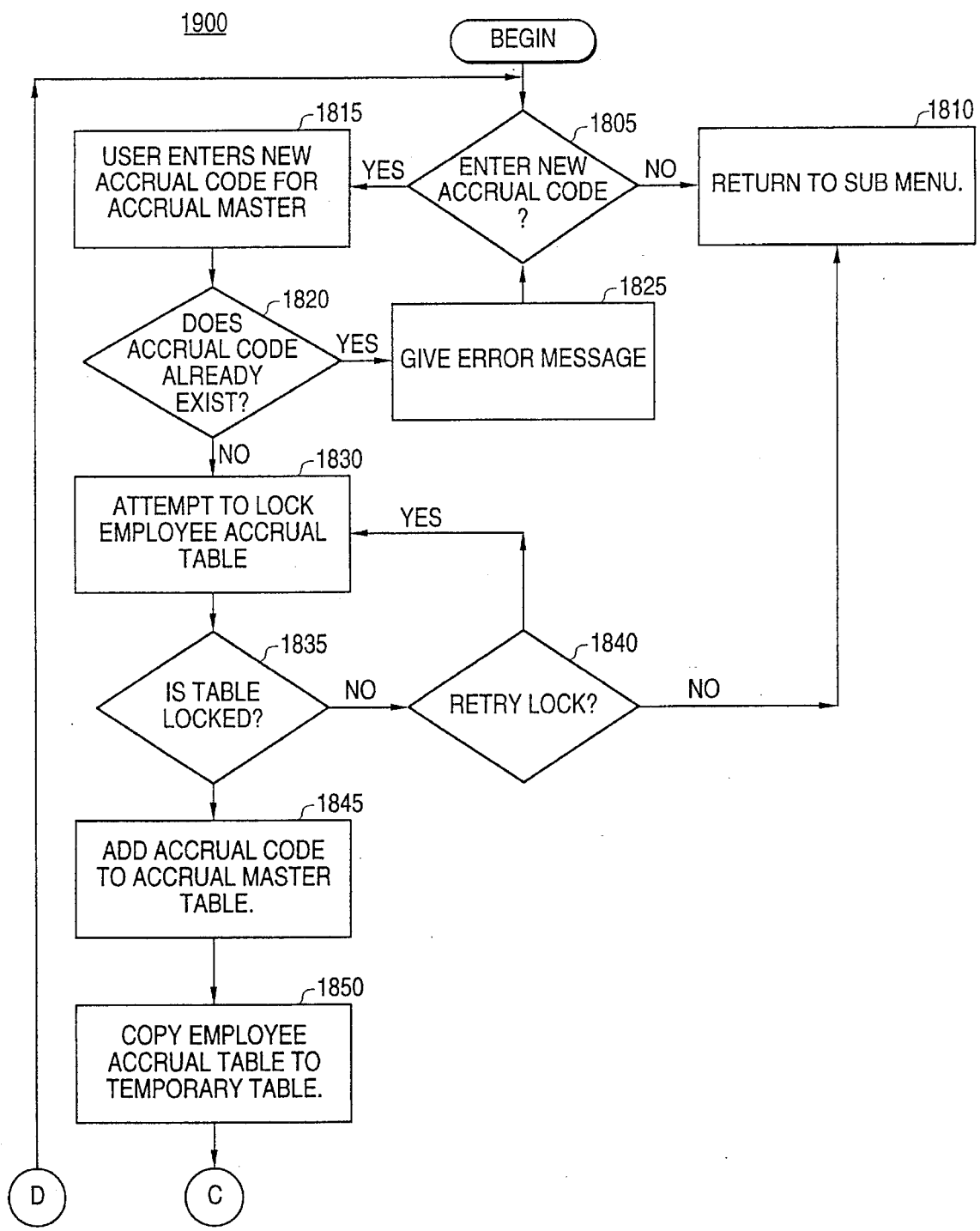
FIG. 18 is a flow diagram of the change system codes process of the preferred implementation.
Figure 19:
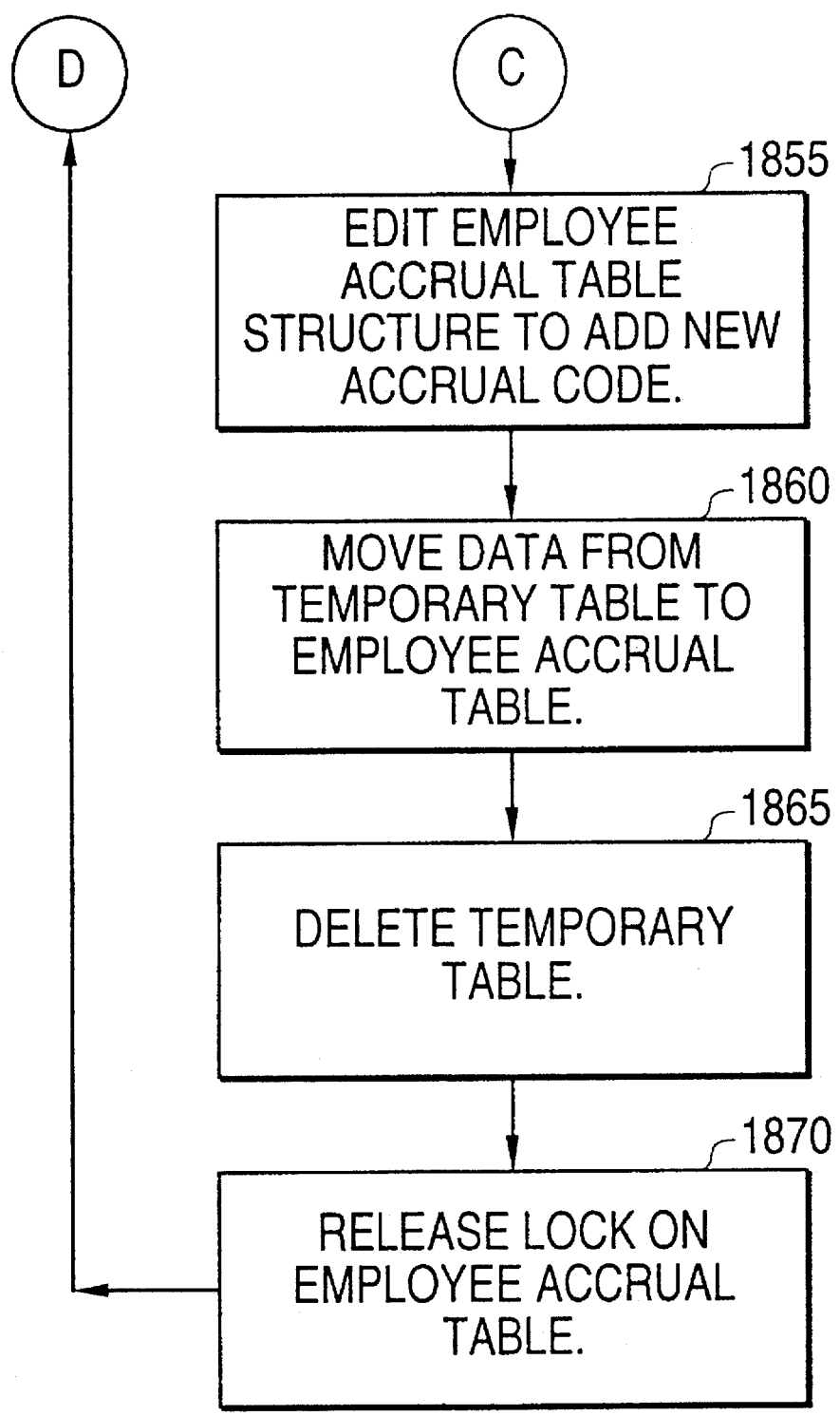
FIG. 19 is a flow diagram of the change system codes process of the preferred implementation (continued from FIG. 18).

FIGS. 18 and 19 illustrate the change system codes process 1900 included in both the Human Resources component 330 and Payroll component 350. The change system codes process 1900 illustrated in FIGS. 18 and 19 specifically refers to when the user selects "B" from the System Codes Menu 1600 (FIG. 16), which permits the user to change accrual codes in the master accrual table (see FIG. 17). A similar process is used to update codes in the payroll data.

First, the Human Resources component 330 determines whether the user wishes to add a new accrual code (step 1805); in other words, has the user selected "B" for "Accrual Codes" in the System Codes Menu 1600. If no, then the Human Resources component 330 returns and displays the System Codes Menu 1600. Otherwise, the user wishes to enter another accrual code (step 1805), and the Human Resources component 330 permits the user to enter the new accrual code for the master accrual table (step 1815). The Human Resources component 330 then determines whether the accrual code entered by the user in step 1815 already exists (step 1820). If yes, then the Human Resources component 330 generates and displays an error message (step 1825) and the process flow returns to step 1805. Otherwise, if the accrual code does not already exist (step 1820), then the Human Resources component 330 attempts to lock the employee accrual table (step 1830), which is a part of the H-R data, and then determines whether the table was successfully locked (step 1835). If the table was not locked (step 1835) because, for example, another user is using the table, then the Human Resources component 330 determines whether it can attempt to relock the table (step 1840). If yes, then process flow returns to step 1830; otherwise, the Human Resources component 330 returns to step 1810 and redisplays the System Codes Menu 1600.

If the table is locked (1835), then the Human Resources component 330 adds the new accrual code to the accrual master table (1845) and copies the employee accrual table to a temporary table (1850). Process flow then continues to step 1855 of FIG. 19.

In step 1855, the Human Resources component 330 edits the employee accrual table structure to add the new accrual code and then, in step 1860, moves the data from the temporary table (see step 1850) to the edited employee accrual table (step 1860). The Human Resources component 330 then deletes the temporary table (1865), releases the lock on the employee accrual table (1870) and process flow returns to step 1805. Using this process flow, the Human Resources component 330 adds accrual codes to the master accrual table, thereby changing the structure of the table, which permits users to enter new accrual codes for employees. The table structure change may be performed without the assistance or intervention of computer programmers.

G. TIME & ATTENDANCE COMPONENT

Figure 14:
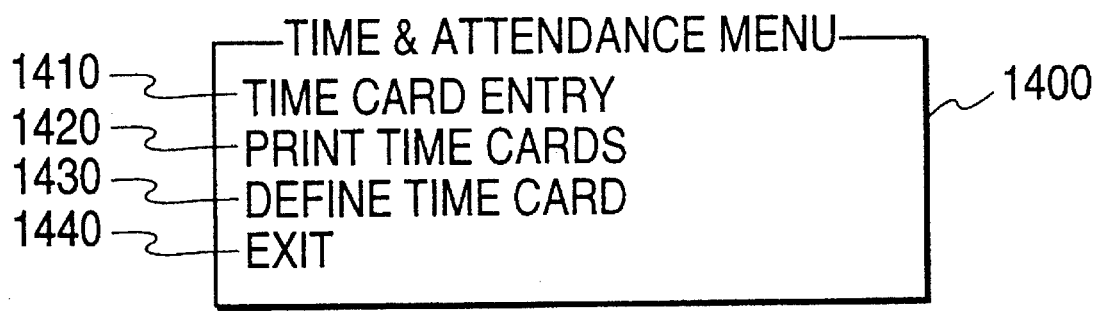
FIG. 14 illustrates a display screen image of the time and attendance menu used by the preferred implementation.

Users initiate the processing of the Time & Attendance component 340 to update time cards and related information. This information is part of the payroll data maintained by CRUPAY 230. FIG. 14 illustrates the Time & Attendance Menu 1400, which is displayed when users select the Time & Attendance option 520 from the Main Menu 500. The menu 1400 includes four selection items: Time Card Entry 1410, Print Time Cards 1420, Define Time Card 1430, and eXit 1440. Selecting either of these items enables the user to perform specific functions corresponding to the selected item. For example, selecting the Time Card Entry option 1410 permits user to enter time card information (which is part of the payroll data managed by CRUPAY 230).

H. REPORTS COMPONENT

The reports component 360 is a part of CRUPAY 230 that includes various processes used by the Human Resources component 330 and Payroll component 350. For example, initiating the Reports component 360 enables users to instruct CRUPAY 230 to generate different payroll reports (see the Payroll Reports option in the Payroll Menu 700 of FIG. 7) and different H-R reports (see the PAF Reports Menu option 1220 in the Human Resources Menu 12 (FIG. 12).

Persons skilled in the art will recognize that the present invention described above overcomes problems and disadvantages of the prior art. They will also recognize that modifications and variations may be made to this invention without departing from the spirit and scope of the general inventive concept.

Additionally, throughout the above description of the preferred implementation, other implementations and changes to the preferred implementation were discussed. Thus, this invention in its broader aspects is therefore not limited to the specific details or representative methods shown and described.

I claim:

1. A system for managing payroll data and human resource data for a plurality of employees, wherein the payroll data includes an employee-type and a plurality of payroll codes, and wherein the human resource data includes an employee-identifier for each of the employees, a salary for each employee, and a plurality of HR codes, the system comprising:

means for storing the payroll data and the human resource data;

means for receiving user input including a pay period;

means for integrating the payroll data and the human resource data by matching the employee-type for each employee with the employee-identifier, and for generating a payroll from the payroll data and the human resource data using the pay period and the salary for each employee; and means for accessing the human resource data while generating the payroll.

2. The system of claim 1 wherein the integrating means includes:

means for recording when a user accesses the payroll data or the human resource data.

3. The system of claim 2 wherein the recording means includes:

means for detailing a change the user made to the payroll data or the human resource data.

4. The system of claim 1 wherein the integrating means includes:

means for adding either a new payroll code or a new HR code.

5. A system for managing payroll data and human resource data for employees, wherein the payroll data includes an employee-type and a plurality of payroll codes, and wherein the human resource data includes an employee-identifier for each of the employees, a salary for each employee, and a plurality of HR codes, the system comprising:

means for storing the payroll data and the human resource data;

means for receiving user input including a pay period;

means for selecting human resource data for certain employees based upon predetermined criteria;

means for storing the selected human resource data in in-progress tables;

means for generating a payroll by matching the employee-type for each employee with the employee-identifier and using the pay period and the salary for each employee.

6. The system of claim 5 wherein the receiving means includes:

means for accessing the human resource data while the generating means generates the payroll.

7. The system of claim 5 wherein the receiving means includes:

means for accessing the human resource data or the payroll data.

8. The system of claim 5 wherein the receiving means includes:

means for recording when a user accesses the human resource data or the payroll data.

9. The system of claim 8 wherein the recording means includes:

means for detailing a change the user made to the payroll data or the human resource data.

10. The system of claim 7 wherein the accessing means includes:

means for adding either a new payroll code or a new HR code.

11. A method for managing payroll data and human resource data for a plurality of employees, wherein the payroll data includes an employee-type and a plurality of payroll codes, and wherein the human resource data includes an employee-identifier for each of the employees, a salary for each employee, and a plurality of HR codes, the method comprising the steps of:

storing the payroll data and the human resource data;

receiving user input including a pay period;

integrating the payroll data and the human resource data by matching the employee-type for each employee with the employee-identifier, and for generating a payroll from the payroll data and the human resource data using the pay period and the salary for each employee; and accessing the human resource data while generating the payroll.

12. The method of claim 11 wherein the integrating step includes the substep of:

recording when a user accesses the payroll data or the human resource data.

13. The method of claim 12 wherein the recording substep includes the sub-substep of:

detailing a change the user made to the payroll data or the human resource data.

14. The method of claim 11 wherein the integrating step includes the substep of:

adding either a new payroll code or a new HR code.

15. A method for managing payroll data and human resource data for employees, wherein the payroll data includes an employee-type and a plurality of payroll codes, and wherein the human resource data includes an employee-identifier for each of the employees, a salary for each employee, and a plurality of HR codes, the method comprising the steps of:

storing the payroll data and the human resource data;

receiving user input including a pay period;

selecting human resource data for certain employees based upon predetermined criteria;

storing the selected human resource data in in-progress tables;

generating a payroll by matching the employee-type for each employee with the employee-identifier and using the pay period and the salary for each employee.

16. The method of claim 15 wherein the receiving step includes the substep of:

accessing the human resource data while the generating means generates the payroll.

17. The method of claim 15 wherein the receiving step includes the substep of:

accessing the human resource data or the payroll data.

18. The method of claim 15 wherein the receiving step includes the substep of:

recording when a user accesses the human resource data or the payroll data.

19. The method of claim 18 wherein the recording substep includes the sub-substep of:

detailing a change the user made to the payroll data or the human resource data.

20. The method of claim 17 wherein the accessing substep includes the sub-substep of:

adding either a new payroll code or a new HR code.

* * * * *